United States Patent
Glik et al.

(10) Patent No.: US 10,713,378 B2
(45) Date of Patent: Jul. 14, 2020

(54) TECHNIQUES FOR EVENTUALLY CONSISTENT INHERITANCE PROPAGATION FOR NESTED CONTENT ITEM NAMESPACES

(71) Applicant: Dropbox, Inc., San Francisco, CA (US)

(72) Inventors: Tsahi Glik, Sunnyvale, CA (US); Shuoqing Ding, San Francisco, CA (US); Ben Newhouse, San Francisco, CA (US); Aaron Staley, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 241 days.

(21) Appl. No.: 15/846,882

(22) Filed: Dec. 19, 2017

(65) Prior Publication Data

US 2019/0188408 A1    Jun. 20, 2019

(51) Int. Cl.
   *G06F 21/62*    (2013.01)
(52) U.S. Cl.
   CPC ...... *G06F 21/6227* (2013.01); *G06F 21/6218* (2013.01)
(58) Field of Classification Search
   CPC ............... H04L 63/101; G06F 21/6218; G06F 21/6227; G06F 2221/2141; G06F 2209/04; G06F 2221/2145
   See application file for complete search history.

(56) References Cited

U.S. PATENT DOCUMENTS 5,956,715 A * 9/1999 Glasser ............... G06F 21/6218
8,812,439 B2 * 8/2014 King ................... G06F 21/6227
                                                  707/626

(Continued)

*Primary Examiner* — Jorge A Casanova
(74) *Attorney, Agent, or Firm* — Hickman Palermo Becker Bingham LLP (57) ABSTRACT

A method and apparatus for inheritance-based propagation is provided. The method comprises receiving a request from a client computer to update an access permission associated with a specific namespace in a nested namespace structure for a user, the specific namespace being associated with a group of users, wherein the nested namespace structure includes one or more child namespaces of the specific namespace; causing updating of the access permission associated with the specific namespace for the user; identifying the specific namespace as the current namespace; and performing an iterative process having the following steps until a termination criterion is satisfied. The iterative process comprises for each of one or more child namespaces nested directly within the current namespace, causing execution of a job for updating a child access permission associated with the child namespace for the user, the execution of at least one of one or more jobs corresponding to the one or more child namespaces of the current namespace comprising automatically re-executing the at least one of the one or more jobs in response to unsuccessful execution of the at least one of the one or more jobs while maintaining at least eventual consistency of the one or more child namespaces with respect to updates. The iterative process further comprises for each of the one or more child namespaces, identifying the child namespace as the current namespace and restarting the iterative process.

20 Claims, 4 Drawing Sheets

(56) References Cited

U.S. PATENT DOCUMENTS

| | | | |
|---|---|---|---|
| 10,037,339 B1* | 7/2018 | Kleinpeter | G06F 16/1744 |
| 10,277,601 B1* | 4/2019 | Higgins | H04L 63/101 |
| 2012/0246115 A1* | 9/2012 | King | G06F 21/6227 |
| | | | 707/626 |
| 2015/0222604 A1* | 8/2015 | Ylonen | H04L 63/062 |
| | | | 713/171 |
| 2016/0198017 A1* | 7/2016 | Alten | G06F 16/16 |
| | | | 709/204 |
| 2016/0292443 A1* | 10/2016 | von Muhlen | G06F 21/6218 |
| 2017/0286707 A1* | 10/2017 | Eda | G06F 21/6218 |
| 2018/0307853 A1* | 10/2018 | Mehta | G06F 16/9027 |

* cited by examiner

TECHNIQUES FOR EVENTUALLY CONSISTENT INHERITANCE PROPAGATION FOR NESTED CONTENT ITEM NAMESPACES

FIELD OF THE INVENTION

The present invention relates to user membership and access permission management, and specifically to propagating inheritance-based membership or access permission changes in a nested content management structure.

BACKGROUND

A content management system may organize content items in a nested namespace structure ("NNS"), where each content item belongs to at least one namespace, a namespace can be directly nested within another namespace ("parent namespace" of the namespace hereinafter), and a content item that belongs to a namespace also belongs to the parent namespace.

Each namespace can be associated with a group of users. The membership of a user in a group associated with a namespace can be inherited from a parent namespace or set directly. When a user is added to or removed from a group associated with a namespace, the membership change can by default be propagated to any namespace nested directly or indirectly in the namespace ("descendant namespace" of the namespace hereinafter).

For each user, a namespace can be associated with access permissions that apply to all content items that belong to the namespace. Each access permission can have a level, such as "read" or "write", which relates to how content items in the namespace can be accessed. Similar to a user group membership, each access permission can also have a type, such as "inherited" where the level of the access permission is inherited from the parent namespace, or "direct" where the level of the access permission is set directly. When the access permission level associated with a namespace changes for a user, which can result from a change in the membership of the user in a group associated with the namespace, the access permission change can by default be propagated to every descendant namespace through the inherited type.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An inheritance propagation system and related methods for efficiently propagating access permission changes on an inheritance basis are disclosed. In response to a request from a client computer for an access permission change associated with a specific namespace for a user, which can result from a request for a group membership change associated with the specific namespace for the user, the system is configured to determine a NNS rooted at the specific namespace, including namespaces nested directly or indirectly within the specific namespace and the corresponding nesting relationships. The system is further configured to determine an appropriate access permission change based on the request for each of the namespaces in the NNS and apply the change in an iterative process, to all the namespaces directly nested within the current namespace ("child namespaces" of the current namespace hereinafter) in each iteration. The system, by working with a job scheduler, is configured to cause application of the changes to the namespaces with as much parallelism as possible and automatic reattempting to apply the changes upon failure, while keeping the state of the NNS consistent at least in that when no new updates are made to the NNS, eventually all accesses to the NNS will return the last updated value. In response to successful application of an access permission change to a name space, the system is further configured to create a notification to the client computer of the accessibility of the namespace in accordance with the request.

The inheritance propagation system offers several technical benefits. Instead of applying all the access permission changes to all the namespaces within the NNS with a single server or otherwise in serial, the system enables parallel application of these changes, thus increasing system scalability and reducing computational time. In addition, by offering an "at least one guarantee" with idempotency to achieve at least eventual consistency, where the application of a change is automatically retried in the right order (with respect to the application of other changes to the same or a different namespace) until success, the system obviates the need for the client computer or other remote systems to keep track of the status of individually applying access permission changes to different namespaces within the NNS. As a result, the system reduces the amount of computational resource required for monitoring such status and the amount of time required addressing unsuccessful application of access permission changes. Furthermore, by timely notification of the client computer of accessibility of the namespaces within the NNS, the system eliminates failed attempts by the client computer to access those namespaces, thereby further improving overall resource utilization and time management.

Example Computing Environment

Figure 1:
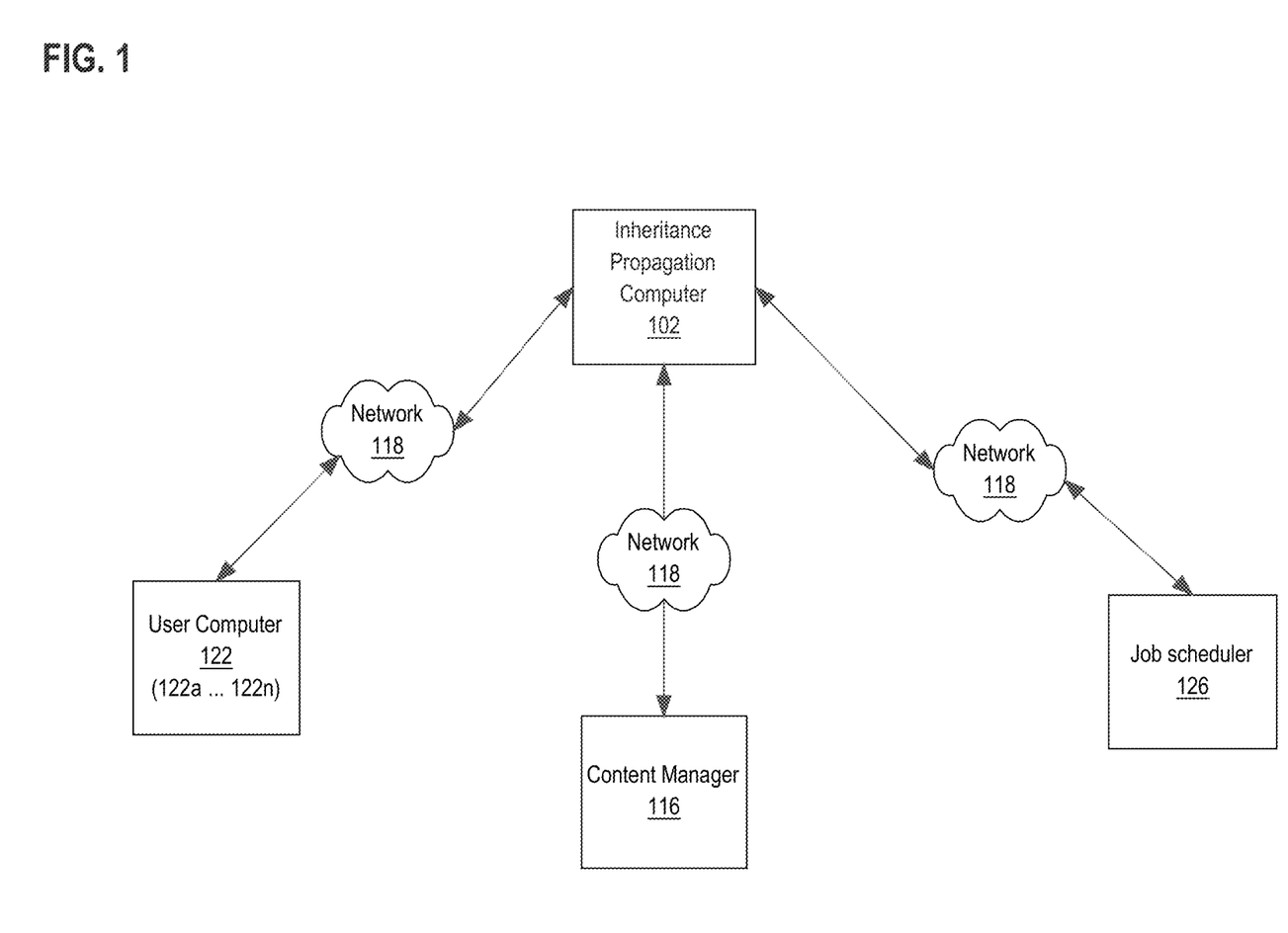
FIG. 1 illustrates an example networked computer system in which various embodiments may be practiced.

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises an inheritance propagation computer ("server" hereinafter) 102, one or more user computers 122, including 122a-122n, a job scheduler 126, and a content manager 116, which are communicatively coupled directly or indirectly via one or more networks 118. The different components of the networked computer system can reside in the same or different computer network domains.

The server 102 broadly represents one or more computers, virtual computing instances, and/or instances of a server-based application that is programmed or configured with data structures and/or database records that are arranged to host or execute functions of an inheritance propagation computer including but not limited to propagating membership changes or access permission changes initiated by a user computer 122a on behalf of a user computer 122b within an NNS rooted at a specific namespace on an inheritance basis and sending status updates to the user computer 122a or 122b. The server 102 can comprise a server farm, a cloud computing platform, a parallel computer, or any other computing facility with sufficient computing power in data processing, data storage, and network communication for the above-described functions.

A user computer 122 is configured to generate a membership change or an access permission change or receive status updates from the server 102. The user computer 122 may comprise a desktop computer, laptop computer, tablet computer, smartphone, wearable device, or any other type of computing device that is capable of proper communication with the server 102 as well as adequate local data presentation, processing, and storage.

The job scheduler 126 is programmed to schedule jobs, such as applying a membership change or access permission change to a namespace, controlling when to execute a job, whether to re-execute a job, and so on, for execution by one or more workers. The content manager 116 is programmed to manage a NNS, including the content items and related metadata organized therein, such as the nesting relationships between pairs of namespaces within the NNS, the groups of users associated with each namespace within the NNS, and the access permissions associated with each namespace for individual users.

The networks 118 may be implemented by any medium or mechanism that provides for the exchange of data between the various elements of FIG. 1. Examples of network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is configured to receive a request for an access permission change associated with a specific namespace from the content manager 116, which can be based on a request for a user group membership change generated by a user computer 122a on behalf of user computer 122b. Typically, a user of the first user computer 122a already has access to the specific namespace and is authorized to update access permissions associated with the specific namespace, while a user of the second user computer 122b does not yet have access to the specific namespace. The server 102 is further programmed to propagate the change within the NNS rooted at the specific namespace iteratively, focusing on applying appropriate changes to the namespaces nested directly within the current namespace in each iteration. Specifically, the server 102 is configured to retrieve from the content manager 116 data regarding the NNS. The server 102 is configured to then submit a job for applying an appropriate change to each namespace within the NNS to the job scheduler 126, to cause scheduling and execution of the submitted jobs. In response to successful execution of a job corresponding to a namespace, the server 102 is further programmed to inform the user computer 122a or 122b of the successful execution, allowing the user computer 122b or a user thereof to access the namespace.

Example Inheritance Propagation Server

In some embodiments, content items may be organized in a NNS, where each content item belongs to at least one namespace, a namespace can be directly nested within a parent namespace, and a content item that belongs to a namespace also belongs to the parent namespace. Such nesting relationships can be managed by the content manager 116.

In some embodiments, a user may have certain access permissions associated with a namespace, which enable the user to access content items that belong to the namespace. Such access permissions can be managed by the server 102, the content manager 116, or another system. Each access permission can have one of several levels, such as read, write, execute, create, delete, or traverse. An order can be enforced on the different levels, such as delete, create, write, read, execute, and traverse in a descending order such that a greater level includes a lesser level. Each access permission can also have one of several types, such as "inherited" for being inherited from a parent namespace or "direct" for being set directly in response to a request from a user computer 122a.

In some embodiments, a namespace may be associated with no group of members or a group of certain members each having certain access permissions associated with the namespace. A user computer 122a may intend to associate a new group including a user with the namespace or to add (or remove) the user as a member to (or from) an existing group associated with the namespace, both of which may lead to establishing at least one new access permission associated with the namespace for the user. Alternatively, the user computer 122a may intend to change an existing access permission associated with the namespace for the user. Ultimately, a request to change an access permission associated with the namespace for the user is sent to the server 102.

In some embodiments, in response to receiving the request, the server 102 is programmed to propagate the access permission change within the NNS rooted at the namespace associated with the access permission change. The server 102 is programmed to initially obtain data regarding the NNS from the content manager 116, including the list of descendant namespaces with the corresponding nesting relationships and the current access permissions associated with namespaces for the user. The server 102 is programmed to then propagate the access permission change iteratively, applying appropriate changes to all the child namespaces of the current namespace in each iteration.

In some embodiments, the server 102 is programmed to submit a job to apply an access permission change to a namespace for execution. The server 102 can be programmed to communicate with a job scheduler 126, such as the job scheduling portion of the event processor described in U.S. Provisional Application 62/549,914, filed Aug. 24, 2017, the entire content of which is incorporated herein by reference. The job scheduler 126 can provide at least one guarantee with idempotency to achieve at least eventual consistency. The at least one guarantee causes a job to be automatically re-scheduled in response to a failure of executing the job. Idempotency of a worker enables a worker to return the same result regardless of how many times the worker executes a job. Eventual consistency guarantees that, if no new updates are made to a given data item, such as a namespace, eventually all accesses to that item will return the last updated value. Idempotency can help ensure that all related jobs affecting the same entity are executed in the right order, which can help achieve eventual consistency of the entity with respect to updates. Depending on the number of workers available in a distributed environment to execute scheduled jobs in parallel, execution of scheduled jobs can be sped up to different extents. More specifically, the jobs can contain metadata that enables the job scheduler 126 or the workers to determine the correct order of execution, even if a job is rescheduled. Also, the job scheduler 126 can add the same job to the same queue accessible to one or more workers to facilitate reordering execution of the jobs in that queue.

In some embodiments, the server 102 is programmed to perform an iterative process propagating the access permission change within the NNS rooted at the namespace associated with the access permission change. During the iterative process, a current namespace is maintained as a point of reference that is initially set to the namespace associated with the access permission change and then changed in each iteration. In each iteration, whether to propagate the access permission change to the child namespaces of the current namespace is determined. In response to a positive determination, the access permission change is propagated to the child namespaces. The current namespace is then changed to each of the child namespaces to restart the iterative process. Further details of the iterative process are further discussed in the next few paragraphs.

In some embodiments, in each iteration, the server 102 is programmed to determine whether to continue propagating the access permission change to any child namespace of the current namespace and if so propagating the access permission change to any child namespace of the current namespace. The server 102 can be configured to compare the current access permissions (or previous ones if a change is already applied to the current namespace) if any and the updated access permission. The updated access permission would have a type of "direct" for the original namespace (the namespace referred to in the request from the user computer 122a) and a type of "inherited" for any descendant namespace.

For example, for a new member of a group, no current access permission would be available, and the change needs to be propagated to any child namespace. For further example, a current access permission may have a type of "inherited" for a level of read, and another current access permission may have a type of "direct" for a level of write, leading to a maximum access permission level of write (assuming that write is greater than read). When the updated access permission has a type of "inherited" or "direct" for a level of create, applying this change or update to the namespace would result in an access permission having a type of "inherited" for a level of create and another (unchanged) access permission having a type of "direct" for a level of write, leading to a maximum level of create (assuming that create is greater than write). When it is the maximum level that is inherited by any child namespace, this change or update needs to be propagated to any child namespace. However, when the updated access permission has a type of "inherited" or "direct" for a level of write, applying this change or update would lead to an access permission having a type of "inherited" for a level of write and another (unchanged) access permission having a type of "direct" for a level of write, leading to the same maximum level of write. When it is the maximum level that is inherited by any child namespace, this change or update does not need to be propagated to any child namespace.

In some embodiments, the server 102 is programmed to submit a job for applying an appropriate access permission change to each of the child namespaces to the job scheduler 126. When the job scheduler 126 coordinates with a plurality of workers and offers the at least one guarantee with idempotency to achieve at least eventual consistency, the jobs for multiple child namespaces can be executed in parallel, and the server 102 is further programmed to expect a notification of successful execution of each of the submitted jobs from the job scheduler 126 or a timeout.

In some embodiments, the server 102 is programmed to track the amount of time elapsed in each iteration and thus the entire propagation process since receiving the request from the user computer. A threshold can be set on the amount of time spent in each iteration or the entire propagation, and the server 102 can be further programmed to terminate the current iteration or transmit a timeout notification to the job scheduler 126, the user computer 122a or 122b, or another remote system when the threshold is met.

In some embodiments, the server 102 is configured to, upon successful execution of a job for applying an access permission change associated with a namespace for a user, transmit a success notification to the user computer 122a or 122b, which indicates that the namespace is now accessible to the user computer 112b in accordance with the request received from the user computer 122a. The transmission of the success notification can also be incorporated into the job and thus performed by a worker. In other embodiments, the server 102 is configured to transmit a notification of the success job execution to the user computer 112a and the content manager 116, and the content manager 116 is then configured to send a notification of the accessibility of the namespace to the user computer 112b.

In some embodiments, the server 102 can be configured to transmit additional status updates to the user computer 122a or 122b at various points of the entire propagation process. For instance, such status updates can include how many times a job is re-executed based on information received from the job scheduler 126, how long it takes to successfully execute a job, how long it takes to execute the jobs corresponding to all child namespaces of the current namespace, etc. The outgoing notifications and updates can be stored in a queue and transmitted individually or in batches; the notifications and updates can be transmitted as soon as each notification or update is generated, at the end of an iteration, or according to a specific schedule.

In some embodiments, a request to change an access permission associated with a namespace for multiple users that belong to the same group associated with the namespace may be received by the server 102. The server 102 is programmed to break the request into multiple requests, one for each user, as different users may have different access permissions associated with a descendant namespace within the NNS rooted at the namespace. Alternatively, multiple requests to change an access permission associated with a namespace respectively for multiple users may be received by the server 102 near simultaneously or in succession. The server 102 is further programmed to carry out consecutive propagation processes for the multiple users, or nearly simultaneous propagation processes when the server 102 is capable of such parallel or non-blocking processing.

In some embodiments, a NNS is hierarchical in that each namespace has at most one parent namespace. Alternatively, a NNS is non-hierarchical, in which case the server 102 is programmed to resolve access permissions inherited from multiple parent namespaces. For example, the server 102 can rely on a certain order of the parent namespaces, such the order of creation or last modification, to determine the priority of inherited access permissions from the different parent namespaces.

Example Inheritance Propagation Client

In some embodiments, in response to an instruction from a certain user to add a new group including a user to be associated with a namespace, add (or remove) a user to (or from) an existing group associated with a namespace, or change the access permission of an existing user of an existing group associated with a namespace, a user computer 122a is configured to submit a corresponding request, which is ultimately delivered to the inheritance propagation server 102. When the instruction is to add the new group to be associated with the namespace or add the user to an existing group associated with the namespace, the user computer 122b is programmed to further obtain data regarding the NNS rooted at the namespace from the content manager 116, such as the set of descendant namespaces and the corresponding nesting relationships. Based on the data regarding the NNS, the user computer 122b is programmed to mount the descendent namespaces to a local storage device and cause notification of the visibility the descendant namespaces.

In some embodiments, subsequently, as the request is being processed by the server 102 and an appropriate access permission change is applied to the descendant namespaces, the user computer 122a or 122b is programmed to receive success notifications from the server 102 each indicating that an access permission change has been successfully applied to one of the descendant namespaces. The user computer 122a or 122b can also be configured to receive various status updates from the server 102, as noted above. The incoming notifications and updates can be stored in a queue and processed individually or in batches; the notifications and updates can trigger further reporting to the certain user as soon as each notification or update is generated or according to a specific schedule.

Example Processes

Figure 2:
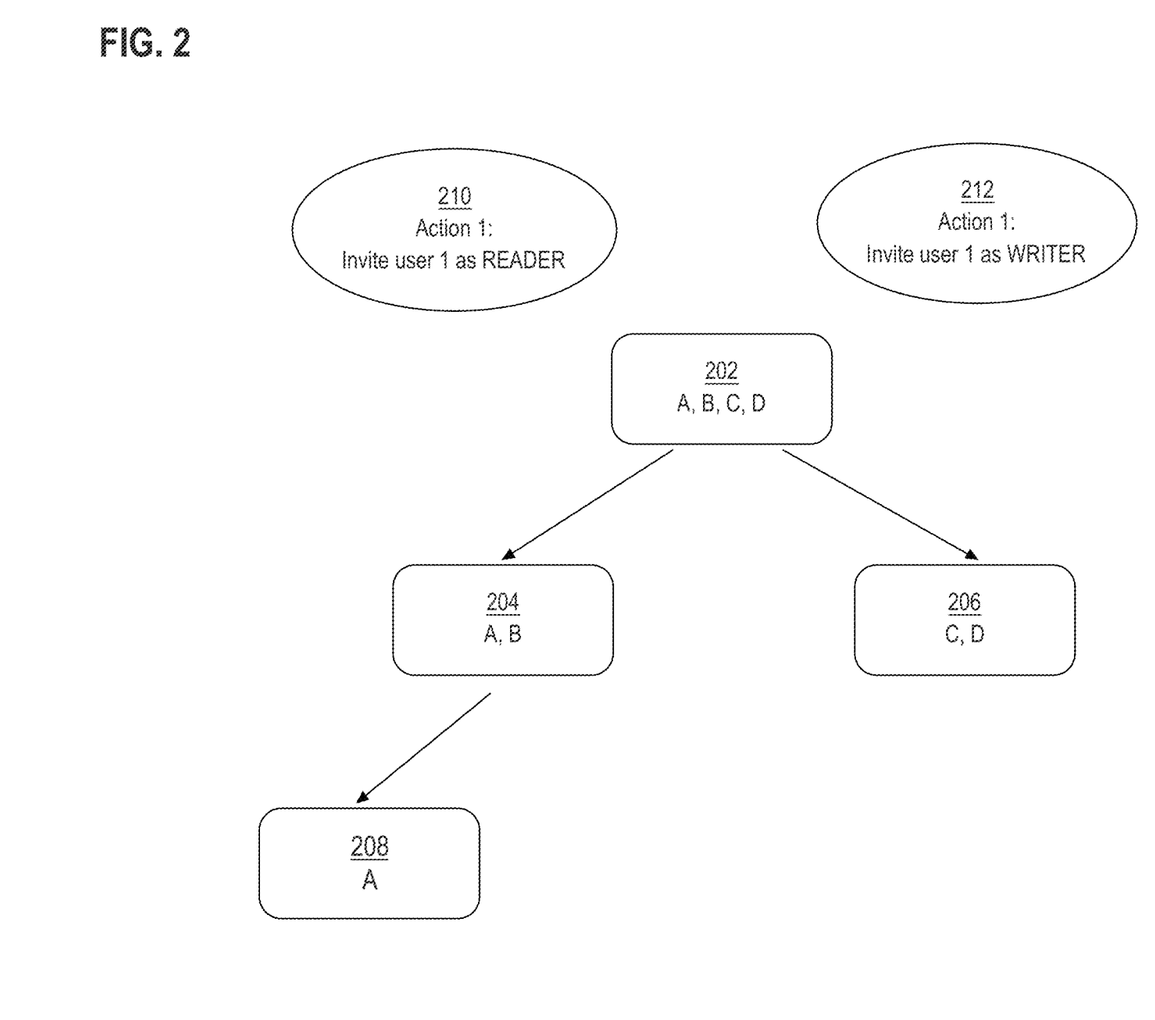
FIG. 2 illustrates an example nested namespace structure.

Further details are explained through the following examples. FIG. 2 illustrates an example nested namespace structure. In some embodiments, the NNS rooted as the namespace 202 includes the namespace 208, which is nested directly within the namespace 204, which is nested directly within the namespace 202. The NNS also includes the namespace 206, which is also nested directly within the namespace 202. The content item A belongs to the namespace 208, the content item B belongs to the namespace 204, and the content items C and D belong to the namespace 206.

In some embodiments, the server 102 is programmed to receive a first request 210 to add a first user to a certain group associated with the namespace 202 with an access permission having a level of read. The server 102 is further configured to create a first job entity for this first request. In addition, the server 102 is configured to maintain several lists corresponding to the first job entity, such as a first list of last processed namespaces pointed to by job_id1 and containing the indices of the last processed namespaces in the NNS rooted at the namespace 202, a second list of pending namespaces pointed to by pending_nma_cursor1 and containing indices of processed namespaces and those to be processed next (child namespaces of last processed namespaces) within the NNS as well as corresponding updated access permission levels, and a third list of all processed namespaces pointed to by processed_nma_cursor1 and containing indices of processed namespaces as well as the corresponding updated access permission levels, where a namespace is processed when the requested access permission change (and any corresponding membership change) has been propagated to the namespace. Initially, the server 102 is configured to set the lists as follows: job_id1={ }, pending_nma_cursor1={ns 202, read}, and processed_nma_cursor1={ }, with "ns" standing for "namespace".

In some embodiments, the server 102 is configured to directly apply an appropriate access permission change corresponding to the first entity, such as by making a local change or submitting a request for applying the change to the content manager 116, or submit a job for applying the appropriate access permission change for execution to the job scheduler 126. In this case, the requested access permission change results in an updated access permission associated with the namespace 202 having a level of read and a type of "direct". In response to successful application of the appropriate access permission change, the server 102 is configured to set job_id1={ns 202}.

In some embodiments, the server 102 is programmed to then receive a second request 212 to change the access permission associated with the namespace 202 for the first user to an access permission having a level of write. The server 102 is similarly configured to create a second job entity for this second request and maintain several lists corresponding to the second job entity, such as a first list of last processed namespaces pointed to by job_id2 and containing the indices of the last processed namespaces in the NNS rooted at the namespace 202, a second list of pending namespaces pointed to by pending_nma_cursor2 and containing indices of processed and those to be processed next (child namespaces of last processed namespaces) within the NNS as well as corresponding updated access permission levels, and a third list of all processed namespaces pointed to by processed_nma_cursor2 and containing indices of processed namespaces as well as corresponding updated access permission levels. Initially, the server 102 is configured to set the lists as follows: job_id2={ }, pending_nma_cursor2={ns 202, write}, and processed_nma_cursor2={ }.

In some embodiments, the server 102 is configured to similarly apply an appropriate access permission change corresponding to the second request directly or submit a job for applying the appropriate access permission change for execution to the job scheduler 126. In this case, the requested access permission change results in an updated access permission having a level of write and a type of direct. In response to successful application of the appropriate access permission change, the server 102 is configured to set job_id2={ns 202}.

In some embodiments, as discussed above, before applying any access permission change to any child namespace of the namespace identified by the first list (e.g., job_id1) or after applying an appropriate access permission change to the namespace identified by the first list, the server 102 is programmed to check whether another request (e.g., the second request noted above) to change the access permission associated with the same namespace for the same user has been received and if so start processing the request (one iteration at a time). Alternatively, the server 102 can be configured to continue processing the current request to completion before processing any newly received request.

In some embodiments, the server 102 is programmed to revisit the first request by determining the value of job_id1, namely the namespace 202. The server 102 is further programmed to determine whether to propagate the requested access permission change to any of the child namespaces of the namespace 202, namely the namespaces 204 and 206. In this case, since the user is newly added to the group associated with the namespace 202, the updated access permission is new and thus needs to be propagated to each of the child namespaces. Alternatively, this step can be performed before checking whether another request has been received.

In some embodiments, at this point, the server is programmed to enforce a lock on the first job entity, so that no change can be applied to the corresponding lists and related data. During the lock period, with job_id1={ns 202}, the server 102 is configured to set the corresponding lists as follows: pending_nma_cursor1={ns 202: read, ns 204: read, ns 206 read}, and processed_nma_cursor1={ns 202: read}. Alternatively, this step can be performed before checking whether another request has been received.

In some embodiments, the server 102 can be configured to submit a request to the content manager 116 to impose a lock on the namespace 202 and each of the child namespaces 204 and 206, so that no other change can be applied to any of these namespaces, including a change to the nesting relationships between the namespace 202 and the namespace 204 and between the namespace 202 and the namespace 206. The server 102 is further programmed to create a job for applying an appropriate access permission change to each of the child namespaces 204 and 206 and submit the jobs to the job scheduler 126. The appropriate access permission change in this case leads to an updated access permission having a type of "inherited" and a level of read. The server 102 is then configured to await a notification of successful execution of each of the submitted jobs from the job scheduler 126 or a timeout.

In some embodiments, in response to successful execution of each of the submitted jobs, the server 102 is programmed to set job_id1={ns 204, ns 206}. The server 102 can be further configured to send a request to the content manager 116 to release the lock on the namespaces 202, 204, and 206.

In some embodiments, the server 102 is programmed to revisit the second request by determining the value of job_id2, namely the namespace 202. The server 102 is further programmed to determine whether to propagate the requested access permission change to any of the child namespaces of the namespace 202, namely the namespaces 204 and 206. In this case, the updated access permission increases the maximum access permission level from read to write (assuming that write is greater than read) and thus needs to be propagated to each of the child namespaces.

In some embodiments, at this point, the server 102 is programmed to enforce a lock on the second job entity, so that no change can be applied to the corresponding lists and related data. During the lock period, with job_id2={ns 202}, the server 102 is configured to set the corresponding lists as follows: pending_nma_cursor2={ns 202: write, ns 204: write, ns 206 write}, and processed_nma_cursor1={ns 202: write}.

In some embodiments, the server 102 can be configured to submit a request to the content manager 116 to impose a lock on the namespace 202 and each of the child namespaces 204 and 206, so that no other change can be applied to any of these namespaces, including a change to the nesting relationships between the namespace 202 and the namespace 204 and between the namespace 202 and the namespace 206. Alternatively, the lock imposed in response to the first request is not released before revising the second request and re-imposed here. The server 102 is further programmed to create a job for applying an appropriate access permission change to each of the child namespaces 204 and 206 and submit the jobs to the job scheduler 126. The requested access permission change in this case leads to an updated access permission having a type of "inherited" and a level of write. The server 102 is then configured to await a notification of successful execution of each of the submitted jobs from the job scheduler 126 or a timeout.

In some embodiments, in response to successful execution of the submitted jobs, the server 102 is programmed to set job_id2={ns 204, ns 206}. The server 102 can be further configured to send a request to the content manager 116 to release the lock on the namespaces 202, 204, and 206.

In some embodiments, the server 102 is programmed to revisit the first request by determining the value of job_id1, namely the namespaces 204 and 206. The server 102 is further programmed to determine whether to propagate the requested access permission change to any of the child namespaces of each of the namespace 204 and 206. In this case, the namespace 204 has one child namespace, namely the namespace 208, and the namespace 206 does not have any child namespace. Since the user is newly added to the group associated with the namespace 204, the updated access permission is new and thus needs to be propagated to the child namespace.

In some embodiments, at this point, the server 102 is similarly configured to enforce a lock on the first job entity. During the lock period, with job_id1={ns 204, ns 206}, the server 102 is configured to set the corresponding lists as follows: pending_nma_cursor1={ns 202: read, ns 204: read, ns 206 read, ns 208 read}, and processed_nma_cursor1={ns 202: read, ns 204: read, ns 206 read}.

In some embodiments, the server can be further configured to submit a request to the content manager 116 to impose a lock on the namespace 204 and the child namespace 208, so that no other change can be applied to either of these namespaces, including a change to the nesting relationships between the namespace 204 and the namespace 208. The server 102 is further programmed to create a job for applying an appropriate access permission change to the child namespace 208 and submit the job to the job scheduler 126. The requested access permission change in this case leads to an updated access permission having a type of "inherited" and a level of read. The server 102 is then configured to await a notification of successful execution of the submitted job from the job scheduler 126 or a timeout.

In some embodiments, as discussed above, after applying appropriate access permission changes to all the namespaces identified by the first list of a request (e.g., both ns 204 and ns 206 identified by job_id1), the server 102 is programmed to switch to processing another request. Alternatively, after applying an appropriate access permission change to each of the namespaces identified by the first list of a request (e.g., only ns 204 identified by job_id1), the server 102 can be programmed to switch to processing another request.

In some embodiments, in response to successful execution of the submitted job, the server 102 is programmed to set job_js1={ns 208}. The server can be further configured to send a request to the content manager 116 to release the lock on the namespaces 204 and 208.

In some embodiments, the server 102 is configured to execute similar steps for the second request and ultimately set the corresponding lists as follows: pending_nma_cursor2={ns 202: write, ns 204: write, ns 206 write, ns 208 write}, processed_nma_cursor2={ns 202: write, ns 204: write, ns 206 write}, and job_id2={ns 208}.

In some embodiments, the server 102 is programmed to revisit the first request by determining the value of job_id1, namely the namespace 208. Since the namespace 208 does not have any child namespace, the server 102 is configured to simply set the corresponding lists as follows: job_id1={ }, pending_nma_cursor1={ns 202: read, ns 204: read, ns 206 read, ns 208 read}, and processed_nma_cursor1={ns 202: read, ns 204: read, ns 206 read, ns 208 read}. Since there is no more namespace to process, the server 102 is configured to terminate the iterative process for the first request.

In some embodiments, similarly, the server 102 is further programmed to revisit the second request second job and ultimately set the corresponding lists as follows: job_id2={ }, pending_nma_cursor2={ns 202: write, ns 204: write, ns 206 write, ns 208 write}, and processed_nma_cursor2={ns 202: write, ns 204: write, ns 206 write, ns 208 write}.

Figure 3:
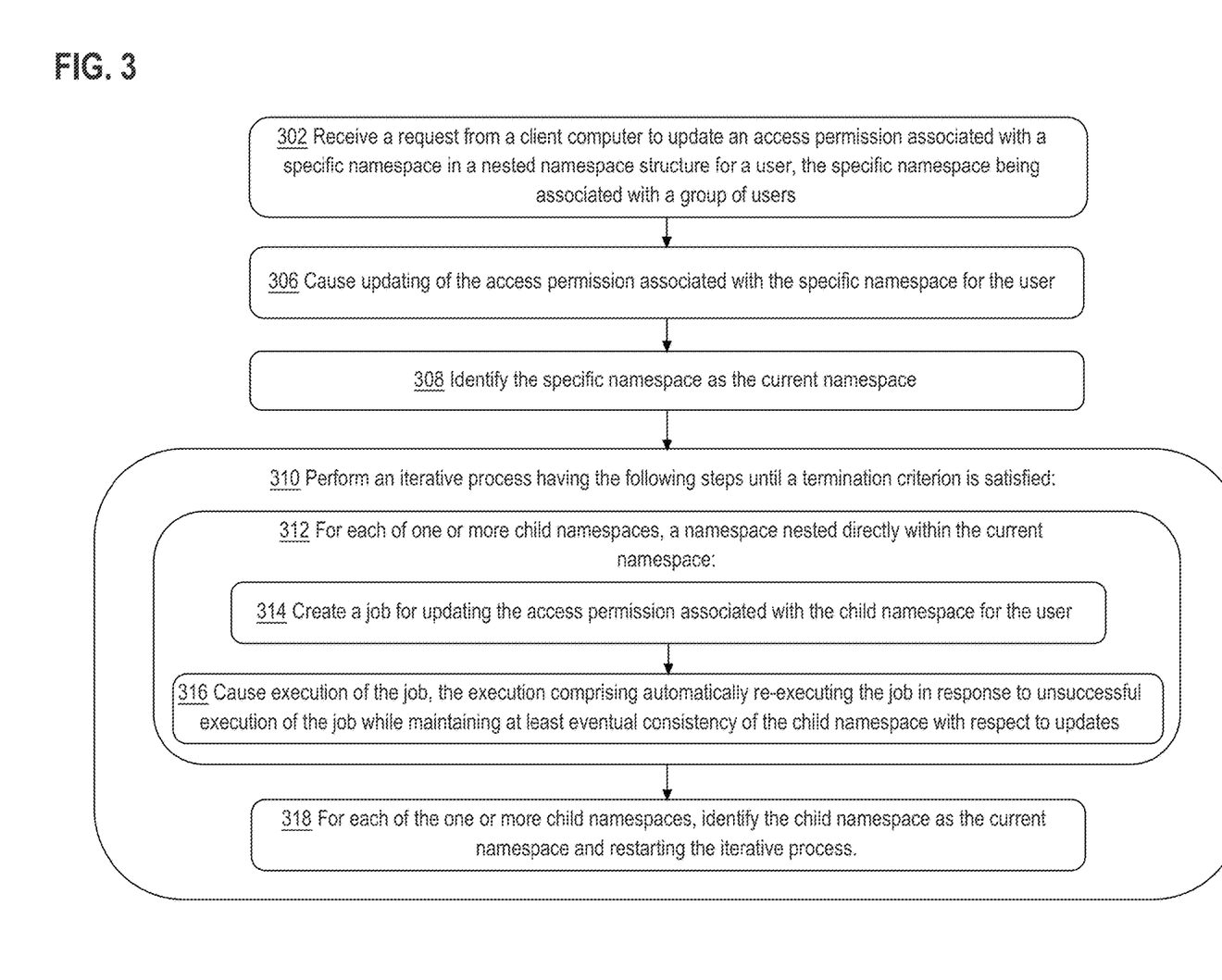
FIG. 3 illustrates an example process performed by an inheritance propagation server to propagate an access permission change within a nested namespace structure.

FIG. 3 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

FIG. 3 illustrates an example process performed by the inheritance propagation server to propagate an access permission change within a nested namespace structure. In step 302, the server 102 is configured to receive a request from a client computer to update an access permission associated with a specific namespace in a NNS for a user. The request can include a requested level of access permission. The specific namespace is generally associated with one or more groups of users, each having one or more members. The access permission change can be a result of a user group membership change for adding (or removing) the user to (or from) one of the groups associated with the specific namespace.

In step 306, the server 102 is programmed to cause updating of the access permission associated with the specific namespace for the user. In this case, the server 102 can be configured to update the access permission directly, or send a request to a remote system for updating the access permission. In the latter case, the remote system can be a system authorized to apply access permission changes or a job scheduler that schedules a job to be executed by the system authorized to apply access permission changes. The job scheduler can work with multiple workers capable of executing scheduled jobs in parallel. Furthermore, the job scheduler can offer the at least one guarantee with idempotency to achieve at least eventual consistency, as noted above, in which case the server 102 is configured to receive a notification from the job scheduler of success execution of the job or a timeout.

In some embodiments, the server 102 is programmed to determine that the access permission update includes changing the access permission having a type of direct and a level of the requested level. The server is further programmed to determine the resulting maximum level for the access permission associated with the specific namespace for the user based on any access permission associated with the specific namespace for the user having a type of "inherited".

In step 308, in response to a successful update of the access permission associated with the specific namespace for the user, the server 102 is programmed to identify the specific namespace as the current namespace, and in step 310, the server 102 is programmed to perform an iterative process having the following steps until a termination criterion is satisfied. The termination criterion includes one or more conditions indicating that propagating the access permission change is not necessary or possible. Examples of these conditions are that the current namespace does not have any child namespace or that the maximum level of the access permission associated with the current namespace for the user does not change as a result of the received request.

In step 312, in response to not satisfying the termination criterion, the server is programmed to perform the following two steps for each of the child namespaces of the current namespace, to propagate the requested access permission change to each of the child namespaces of the current namespace, before any further propagation. To expedite propagation of the requested access permission change to the child namespaces, in step 314, the server 102 is programmed to create a job for applying an appropriate access permission change to each of the child namespaces, and in step 316, the server is programmed to submit the job to the job scheduler, as described above, so that these jobs can be executed in parallel. When the job scheduler offers the at least one guarantee with idempotency to achieve at least eventual consistency, as noted above, the server 102 is configured to receive a notification from the job scheduler of success execution of the job or a timeout for at least one of these jobs.

In step 318, in response to successful execution of the jobs corresponding to the child namespaces, the server 102 is programmed to identify each of the child namespaces as the current namespace and restart the iterative process, to further propagate the requested access permission change to the rest of the NNS. In response to successful execution of a job corresponding to a child namespace, the server 102 can be configured to further create a notification to the client computer of the accessibility of that child namespace in accordance with the request. The notification can be deposited in a queue and delivered in batches or individually; they can be transmitted immediately, at the end of each iteration, or according to other specific schedules.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
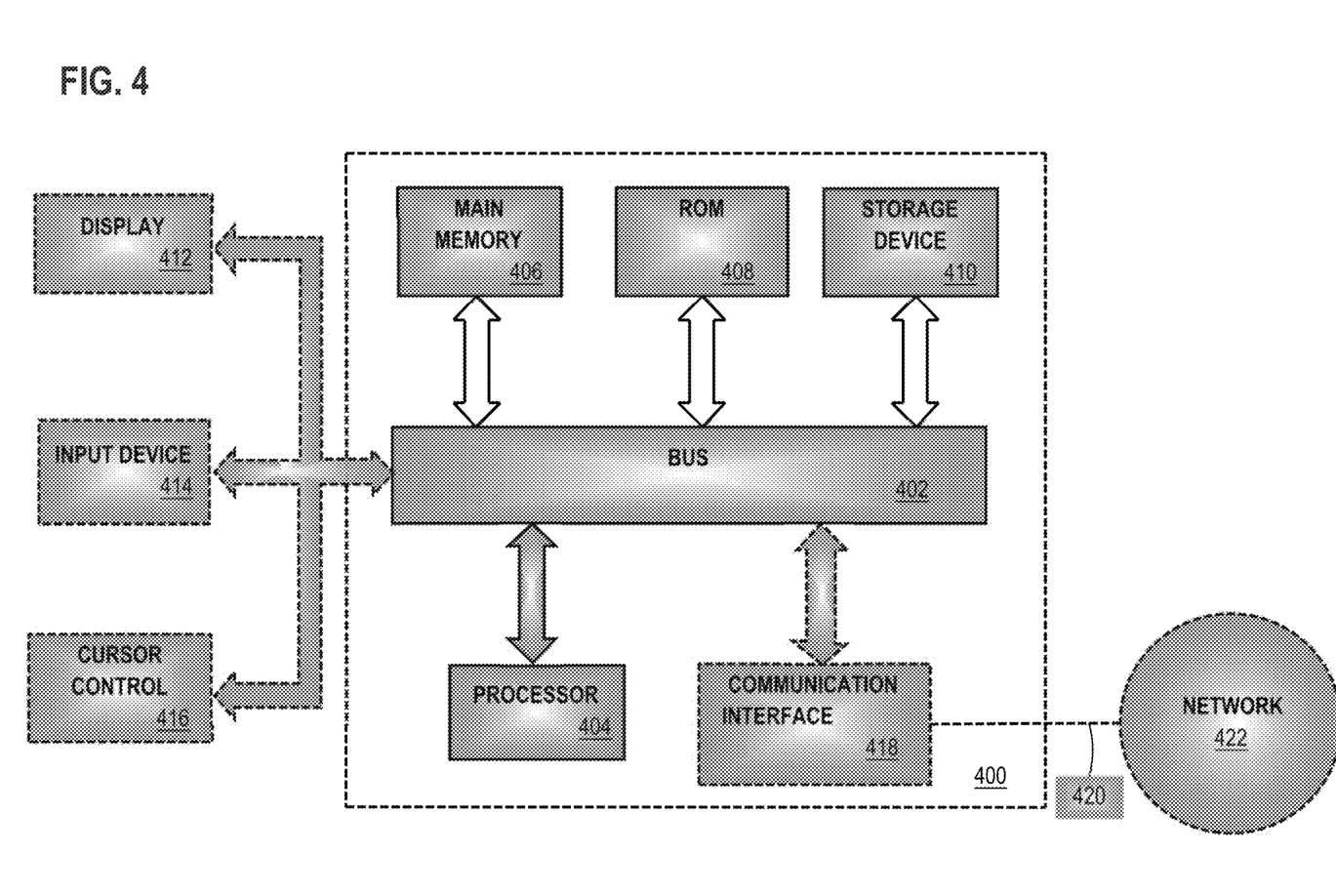
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a request from a client computer to update an access permission associated with a specific namespace in a nested namespace structure for a user,
the specific namespace being associated with a group of users,
wherein the nested namespace structure includes one or more child namespaces of the specific namespace,
the request including a requested level of the access permission;
causing updating of the access permission associated with the specific namespace for the user;
identifying the specific namespace as a current namespace; and
performing an iterative process having the following steps until a termination criterion is satisfied:
determining an updated level of the access permission associated with the current namespace for the user for propagation to each of the one or more child namespaces based on comparing a current level of the access permission associated with the current namespace for the user and the requested level;
for each of one or more child namespaces nested directlty within the current namespace, causing execution of a job for updating a child access permission associated with the child namespace for the user based on the updated level of the access permission, unless the termination criterion is satisfied,
the execution of at least one of one or more jobs corresponding to the one or more child namespaces of the current namespace comprising automatically re-executing the at least one of the one or more jobs in response to unsuccessful execution of the at least one of the one or more jobs while maintaining at least eventual consistency of the one or more child namespaces with respect to updates; and
for each of the one or more child namespaces, identifying the child namespace as the current namespace with the updated level now as the requested level and restarting the iterative process,
wherein the method is performed by one or more computing devices.

2. The method of claim 1, the access permission having a level of read, write, execute, create, delete, or traverse.

3. The method of claim 1, causing updating of the access permission associated with the specific namespace for the user comprising:
creating a specific job for updating the access permission associated with the specific namespace for the user;
causing execution of the specific job, the execution comprising automatically re-executing the specific job in response to unsuccessful execution of the specific job while maintaining at least eventual consistency of the specific namespace with respect to updates.

4. The method of claim 1, the termination criterion including that the current namespace has no child namespace or that a maximum level of the access permission associated with the current namespace for the user does not change from updating the access permission associated with the current namespace for the user.

5. The method of claim 1, the request including adding the user to the group of users.

6. The method of claim 1, further comprising, in response to successful execution of the job in the iterative process, transmitting a notification to the client computer of accessibility of the child namespace in accordance with the request.

7. The method of claim 1, further comprising:
in response to receiving the request from the client computer, initiating a timer to track elapsed time;
in response to determining that the tracked elapsed time has exceeded a threshold, sending a notification to a remote computer.

8. The method of claim 1, further comprising:
before creating any job in the iterative process, submitting a request to impose a membership lock on the current namespace and each of the child namespaces;
in response to successful execution of the jobs corresponding to the one or more child namespaces, submitting a request to release the membership lock.

9. The method of claim 1, further comprising:
in response to successive execution of a job in the iterative process, adding the corresponding child namespace to a list of processed namespaces;
creating a job in the iterative process comprising determining that the child namespace is not on the list of processed namespaces.

10. The method of claim 1, causing execution of the job comprising causing the job to be added to a queue.

11. The method of claim 1, causing execution of the job comprising submitting the job to a remote job scheduler configured to automatically re-schedule the job in response to unsuccessful execution of the job while maintaining at least eventual consistency of the child namespace with respect to updates.

12. The method of claim 11, the remote job scheduler further configured to add the job to a same queue each time the job is scheduled.

13. One or more non-transitory storage media storing instructions which, when executed by one or more computing devices, cause performance of a method, the method comprising:
receiving a request from a client computer to update an access permission associated with a specific namespace in a nested namespace structure for a user,
the specific namespace being associated with a group of users, wherein the nested namespace structure includes one or more child namespaces of the specific namespace,
the request including a requested level of the access permission;
causing updating of the access permission associated with the specific namespace for the user;
identifying the specific namespace as a current namespace; and
performing an iterative process having the following steps until a termination criterion is satisfied:
determining an updated level of the access permission associated with the current namespace for the user for propagation to each of the one or more child namespaces based on comparing a current level of the access permission associated with the current namespace for the user and the requested level;
for each of one or more child namespaces nested directly within the current namespace, causing execution of a job for updating a child access permission associated with the child namespace for the user based on the updated level of the access permission, unless the termination criterion is satisfied, the execution of at least one of one or more jobs corresponding to the one or more child namespaces of the current namespace comprising automatically re-executing the at least one of the one or more jobs in response to unsuccessful execution of the at least one of the one or more jobs while maintaining at least eventual consistency of the one or more child namespaces with respect to updates; and for each of the one or more child namespaces, identifying the child namespace as the current namespace with the updated level now as the requested level and restarting the iterative process.

14. The one or more non-transitory storage media of claim 13, causing updating of the access permission associated with the specific namespace for the user comprising:

creating a specific job for updating the access permission associated with the specific namespace for the user;

causing execution of the specific job, the execution comprising automatically re-executing the specific job in response to unsuccessful execution of the specific job while maintaining at least eventual consistency of the specific namespace with respect to updates.

15. The one or more non-transitory storage media of claim 13, the termination criterion including that the current namespace has no child namespace or a maximum level of the access permission associated with the current namespace for the user does not change from updating the access permission associated with the current namespace for the user.

16. The one or more non-transitory storage media of claim 13, at least two of the one or more jobs corresponding to the one or more child namespaces of the current namespace are executed in parallel.

17. The one or more non-transitory storage media of claim 13, causing execution of the job comprising submitting the job to a remote job scheduler configured to automatically re-schedule the job in response to unsuccessful execution of the job while maintaining at least eventual consistency of the child namespace with respect to updates.

18. A system comprising:

one or more processors;

one or more memories storing computer-executable instructions which, when executed by the one or more processors, cause performance of a method, the method comprising:

receiving a request from a client computer to update an access permission associated with a specific namespace in a nested namespace structure for a user, the specific namespace being associated with a group of users, wherein the nested namespace structure includes one or more child namespaces of the specific namespace, the request including a requested level of the access permission;

causing updating of the access permission associated with the specific namespace for the user;

identifying the specific namespace as a current namespace; and performing an iterative process having the following steps until a termination criterion is satisfied:

determining an updated level of the access permission associated with the current namespace for the user for propagation to each of the one or more child namespaces based on comparing a current level of the access permission associated with the current namespace for the user and the requested level;

for each of one or more child namespaces nested directly within the current namespace, causing execution of a job for updating a child access permission associated with the child namespace for the user based on the updated level of the access permission, unless the termination criterion is satisfied, the execution of at least one of one or more jobs corresponding to the one or more child namespaces of the current namespace comprising automatically re-executing the at least one of the one or more jobs in response to unsuccessful execution of the at least one of the one or more jobs while maintaining at least eventual consistency of the one or more child namespaces with respect to updates; and for each of the one or more child namespaces, identifying the child namespace as the current namespace with the updated level now as the requested level and restarting the iterative process, wherein the method is performed by one or more computing devices.

19. The system of claim 18, causing updating of the access permission associated with the specific namespace for the user comprising:

creating a specific job for updating the access permission associated with the specific namespace for the user;

causing execution of the specific job, the execution comprising automatically re-executing the specific job in response to unsuccessful execution of the specific job while maintaining at least eventual consistency of the specific namespace with respect to updates.

20. The system of claim 18, the method further comprising:

before creating any job in the iterative process, submitting a request to impose a membership lock on the current namespace and each of the child namespaces;

in response to successful execution of the jobs corresponding to the one or more child namespaces, submitting a request to release the membership lock.

* * * * *